(12) United States Patent  
Kozitsky et al.

(10) Patent No.: US 8,781,172 B2  
(45) Date of Patent: Jul. 15, 2014

(54) METHODS AND SYSTEMS FOR ENHANCING THE PERFORMANCE OF AUTOMATED LICENSE PLATE RECOGNITION APPLICATIONS UTILIZING MULTIPLE RESULTS

(75) Inventors: Vladimir Kozitsky, Rochester, NY (US); Aaron Michael Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 97 days.

(21) Appl. No.: 13/435,875

(22) Filed: Mar. 30, 2012

(65) Prior Publication Data

US 2013/0259314 A1 Oct. 3, 2013

(51) Int. Cl.
*G06K 9/00* (2006.01)
*G08G 1/01* (2006.01)
*H04N 7/18* (2006.01)
*B60Q 1/56* (2006.01)

(52) U.S. Cl.
USPC ............ 382/105; 340/933; 348/149; 362/497

(58) Field of Classification Search
USPC .......... 382/103, 104, 105, 236; 348/148, 149, 348/169, 170, 171, 172; 340/2.1, 5.1, 10.1, 340/928, 933, 937, 988; 362/497
See application file for complete search history.

(56) References Cited

U.S. PATENT DOCUMENTS

| | | | |
|---|---|---|---|
| 6,339,651 B1 * | 1/2002 | Tian et al. | |
| 6,473,517 B1 * | 10/2002 | Tyan et al. | 382/105 |
| 7,068,185 B2 * | 6/2006 | Kavner | 340/933 |
| 2005/0084134 A1 | 4/2005 | Toda | |
| 2009/0161913 A1 | 6/2009 | Son | |
| 2009/0202105 A1 | 8/2009 | Castro Abrantes et al. | |
| 2010/0052947 A1 | 3/2010 | Lin et al. | |

OTHER PUBLICATIONS

Hamey, L. G. C. et al., "Automatic Number Plate Recognition for Australian Conditions," Digital Image Computing: Techniques and Applications (2005) DICTA '05, Proceedings, Dec. 6-8, 8 pages.

* cited by examiner

*Primary Examiner* — Abolfazl Tabatabai
(74) *Attorney, Agent, or Firm* — Kermit D. Lopez; Luiz M. Ortiz; Ortiz & Lopez, PLLC

(57) ABSTRACT

Methods, systems and processor-readable media for enhancing performance of an automated license plate recognition system utilizing multiple results. Multiple images can be captured as a vehicle passes through an observation zone and each image can be processed utilizing an ALPR unit to obtain a plate code result and associated confidence values. Iterative processing of character level information across an OCR code followed by a higher level error checking based on learned context information can be performed. A string correlation approach can be employed to optimally align the OCR code from multiple images despite noise factors. The OCR confidence and state mask information can then be leveraged to select a character for an output plate code taking into account the ALPR error sources.

20 Claims, 10 Drawing Sheets

METHODS AND SYSTEMS FOR ENHANCING THE PERFORMANCE OF AUTOMATED LICENSE PLATE RECOGNITION APPLICATIONS UTILIZING MULTIPLE RESULTS

TECHNICAL FIELD

Embodiments are generally related to the field of ALPR (Automatic License Plate Recognition). Embodiments are also related to image processing. Embodiments are further related to the enhancement of automated license plate recognition capabilities.

BACKGROUND OF THE INVENTION

ALPR (Automatic License Plate Recognition) system often functions as the core module of "intelligent" transportation infrastructure applications. License plate recognition can be employed to identify a vehicle by automatically reading a license plate utilizing an image processing and character recognition technology. A license plate recognition operation can be performed by locating the license plate in an image, segmenting the characters in the plate, and performing an OCR (Optical Character Recognition) operation with respect to the characters identified.

ALPR system performance can be typically quoted in terms of yield and accuracy where yield represents a percentage of conclusions drawn for a given number of transactions and accuracy represents a percentage of conclusion that are correct. In LPR applications multiple images can be captured as part of a single transaction (e.g. front and rear plate images) in which all or most of the images include the license plate belonging to a target vehicle. Factors such as, for example, camera placement, camera resolution, speed of traffic, and capture trigger reliability dictate a number of images that need to be captured to reliably identify any vehicle passing through a toll zone. The result from the image containing a highest confidence can be typically chosen as a conclusion for the transaction. Such an approach is suboptimal in that information from rejected conclusions can be ignored.

For example, an ALPR error occurs when a valid but low confidence border character is dropped from an output code making an overall confidence of the code higher while incorrect. Imaging conditions change from capture to capture and vehicle to vehicle and parts of the plate code may be easier to read in the rejected conclusions than in the selected conclusion. In particular, the ALPR results from different images can have set of unique distortions, for example, one or more OCR errors, dropped characters, additional invalid characters (e.g. logos, special symbols, or border artifacts interpreted as real characters). Leveraging the LPR results across multiple views of the similar license plate is not an easy task.

FIG. 1 illustrates a view of license plate images 110 and 120 and a table 130 including sample data obtained from a prior art LPR system. The images 110 and 120 represent front and rear license plate images. The plate data shown in Table 130 possesses multiple errors that must be confronted by, for example, an additional character for one of the results and a disagreement between the results at two of the other character locations. Testing the confidence against the threshold leads to an additional "L" being dropped. The remaining characters that are in disagreement can then be selected based on a superior confidence.

Based on the foregoing, it is believed that a need exists for an improved automated license plate recognition system and method. A need also exists for an improved method for enhancing the performance of the automated license plate recognition system utilizing multiple results, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved automated license plate recognition methods, systems and processor-readable media.

It is another aspect of the disclosed embodiments to provide for methods, systems and processor-readable media for enhancing the performance of an automated license plate recognition system utilizing multiple results.

It is yet another aspect of the disclosed embodiments to provide for improved string correlation methods, systems and processor-readable media for identifying an optimal alignment of OCR codes across multiple ALPR results for a given vehicle.

The aforementioned aspects and other objectives and advantages can now be achieved as described herein. Systems, methods and processor-readable media for enhancing the performance of an automated license plate recognition unit/system utilizing multiple results are disclosed herein. Multiple images (e.g., front and rear license plate images) can be captured as a vehicle passes through an observation zone and each image can be processed utilizing an ALPR (Automatic License Plate Recognition) unit to obtain a plate code result and associated confidence values. An iterative processing of character level information across an OCR (Optical Character Recognition) code followed by a higher level error checking based on learned context information can be performed. A string correlation approach can be employed to optimally align the OCR code from multiple images despite noise factors. The OCR confidence and state mask information can then be leveraged to select a character for an output plate code taking into account the ALPR error sources. Such an approach leads to a more accurate result and increases the system yield.

The iterative process can be employed to parse through the available OCR result and identify a common pattern between them utilizing the string correlation approach. A pair of test strings can be slid past one another location by location and a number of matching characters between the codes can be recorded at each index value. An index (offset) value, which provides most common elements between the strings, can be identified utilizing the correlation information. The strings can be aligned based on the optimal offset to partition the codes into the common patterns and a residual block. After the code strings have been partitioned, any non-matching locations in the common pattern block can be identified and the highest confidence OCR result can be selected to resolve the ambiguity. Each remaining residual block can then be processed again utilizing the correlation analysis. An error can be flagged if the residual blocks for both codes are of different lengths and have no characters in common. If all characters have been labeled as "complete", the algorithm can be terminated.

A secondary error checking can be applied if the low-level character by character processing is complete to leverage information regarding valid license plate sequences for different states. A plate mask, placement of characters in particular positions, and frequency that each mask and character combination appears in a training set can be employed as input to a machine learning module that determines a jurisdiction of the vehicle. The machine learning module determines a likely state and a confidence associated with the conclusion can be employed in determining whether a plate code is likely correct. Sorting all the decisions made at the character level from a lowest margin to a highest margin above an OCR threshold permits to undo the changes starting with the one most likely to be wrong. This process continues as long as the state identification module returns a low confidence for the overall ALPR result.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
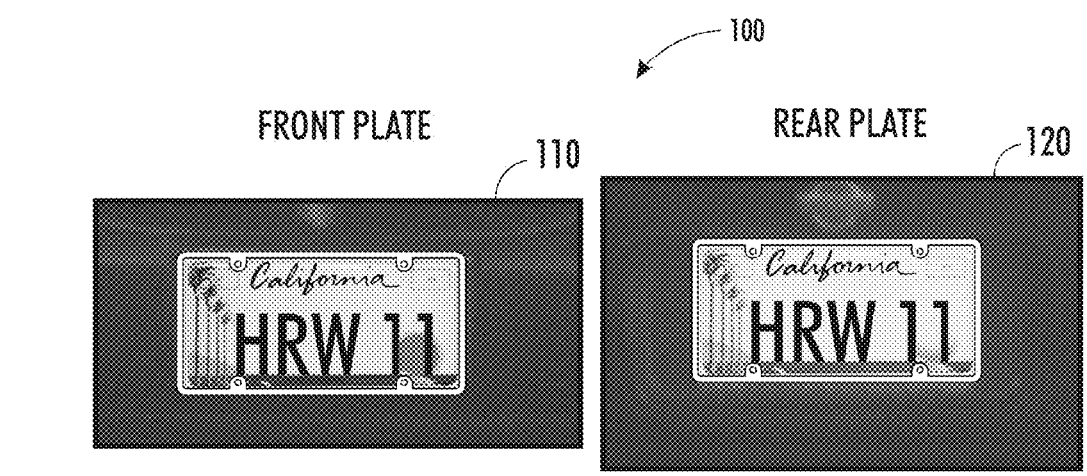
FIG. 1 illustrates a perspective view of license plate images and sample data obtained from a license plate recognition system.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an Internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
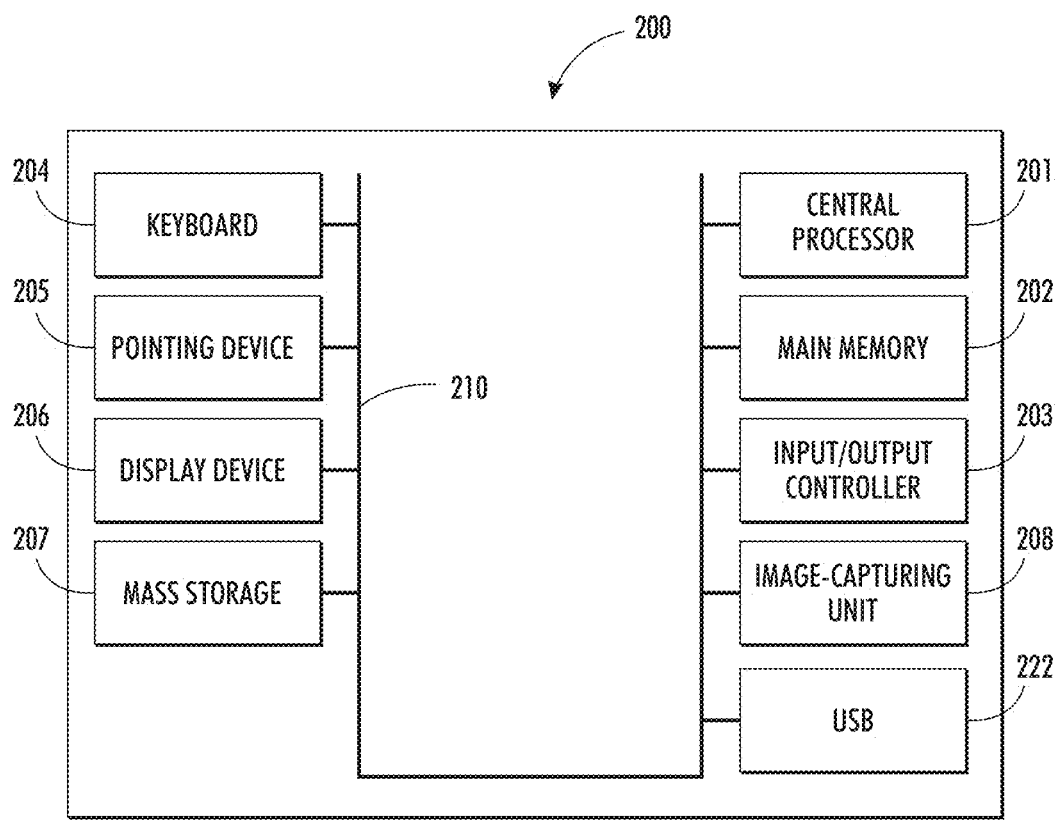
FIG. 2 illustrates a schematic view of a computer system, in accordance with the disclosed embodiments.
Figure 3:
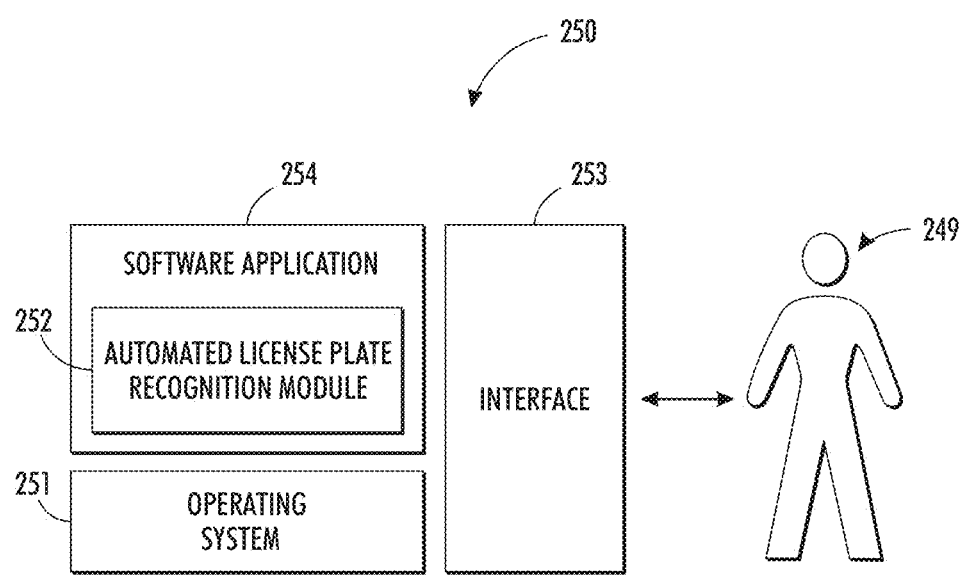
FIG. 3 illustrates a schematic view of a software system including an automated license plate recognition module, an operating system, and a user interface, in accordance with the disclosed embodiments.

FIGS. 2-3 are provided as exemplary diagrams of data-processing environments in which embodiments of the present invention may be implemented. It should be appreciated that FIGS. 2-3 are only exemplary and are not intended to assert or imply any limitation with regard to the environments in which aspects or embodiments of the disclosed embodiments may be it implemented. Many modifications to the depicted environments may be made without departing from the spirit and scope of the disclosed embodiments.

As illustrated in FIG. 2, the disclosed embodiments may be implemented in the context of a data-processing system 200 that includes, for example, a central processor 201, a main memory 202, an input/output controller 203, a keyboard 204, an input device 205 (e.g., a pointing device such as a mouse, track ball, pen device, etc.), a display device 206, a mass storage 207 (e.g., a hard disk), and a USB (universal serial bus) peripheral connection 222. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 3 illustrates a computer software system 250 for directing the operation of the data-processing system 200 depicted in FIG. 2. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system module 251 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 253, which is preferably a graphical user interface (GUI), can serve to display results, whereupon a user may supply additional inputs or terminate a particular session. In some embodiments, operating system 251 and interface 253 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 251 and interface 253. The software application 254 can include, for example, an automated license plate recognition module 252 for enhancing the performance of the automated license plate recognition system utilizing multiple results. The automated license plate recognition module 252 can include instructions such as those of methods 500-600 discussed herein with respect to FIGS. 7-8.

FIGS. 2-3 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 4:
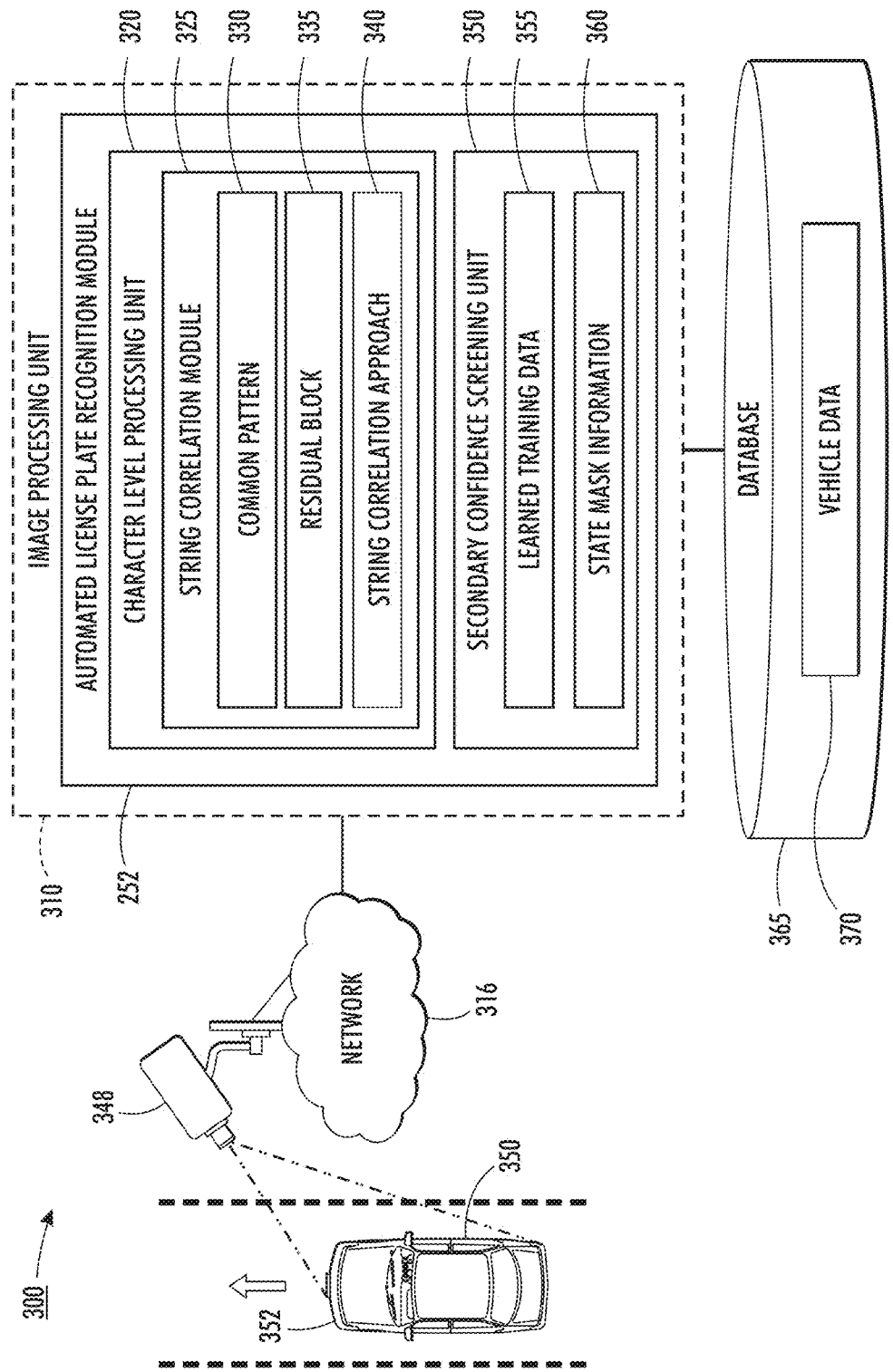
FIG. 4 illustrates a block diagram of an automated license plate recognition system, in accordance with the disclosed embodiments.

FIG. 4 illustrates a block diagram of an automated license plate recognition system 300, in accordance with the disclosed embodiments. Note that in FIGS. 2-13, identical or similar blocks are generally indicated by identical reference numerals. The system 300 enhances the performance of an automated license plate recognition (ALPR) system, which is a special form of optical character recognition (OCR). License plate recognition is a type of technology, mainly software, that enables a computer system to read automatically a registration number (license number) of vehicles from a digital picture. Reading automatically the registration number means transforming the pixels of a digital image into an ASCII text of a number plate.

The license plate recognition system 300 generally includes an image capturing unit 348 (e.g., camera) for capturing an image of a vehicle 350 within an effective field of view. The image capturing unit 348 can be operatively connected to an image processing unit 310 via a network 316. Note that the image capturing unit 348 described in greater detail herein are analogous or similar to the image capturing unit 208 of the data-processing system 200, depicted in FIG.

2. The image-capturing unit 208 may include built-in integrated functions such as image processing, data formatting, and data compression functions.

Note that the network 316 may employ any network topology, transmission medium, or network protocol. The network 316 may include connections such as wire, wireless communication links, or fiber optic cables. Network 316 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The image capturing unit 348 integrated with the image processing unit 310 continuously monitors traffic within an effective field of view. The image processing unit 310 receives the captured image from the image capturing unit 348 in order to process the image. The image processing unit 310 is preferably a small, handheld computer device or palmtop computer as depicted in FIG. 2 that provides portability and is adapted for easy mounting.

The license plate recognition module 252 includes a character level processing unit 320 and a secondary confidence unit 350. It can be appreciated that the character level processing unit 320 and the secondary confidence unit 350 can be implemented as software modules. The image capturing unit 348 captures multiple images (e.g., front and rear license plate images) as the vehicle 350 passes through an observation zone and the image processing unit 310 processes each image utilizing the license plate recognition module 252 to obtain a plate code result and associated confidence values. Vehicle data 370, for example, the vehicle license plate images, plate code, etc., can be stored in a database 365.

A string correlation module 325 can be employed to optimally align an OCR (Optical Character Recognition) code from multiple images despite noise factors utilizing a string correlation approach 340. The character level processing unit 320 leverages the OCR confidence and state mask information to select characters for an output plate code taking into account the ALPR error sources. The character level processing unit 320 performs an iterative processing of character level information across the OCR codes. The secondary confidence screening unit 350 performs a higher level error checking based on learned context information 355 and state mask information 360.

Figure 5:
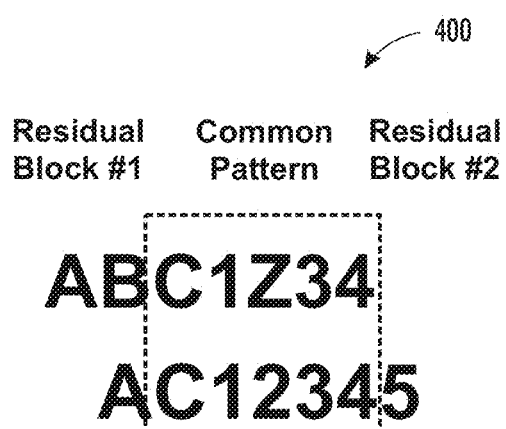
FIG. 5 illustrates a perspective view of an OCR result having a common pattern and a residual block, in accordance with the disclosed embodiments.
Figure 6:
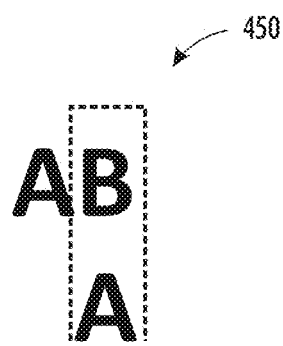
FIG. 6 illustrates a perspective view of processing the residual block shown in FIG. 5, in accordance with the disclosed embodiments.

The string correlation module 325 parse through the available OCR results and identify common patterns 330 between them using the string correlation approach 340. The common patterns 330 can be defined to be sub-strings with at least some matching characters between them, which are bounded by matching characters as depicted in FIG. 5. The strings can slide past one another location by location and the number of matching characters between the codes can be recorded at each index value. Using the correlation information, the index (offset) value which provides a most common element between the strings can be identified.

The strings can be aligned based on an optimal offset to partition the codes into the common patterns 330 and a residual block 335 (i.e., the other sub-strings of the two codes) as depicted in FIG. 5. After the code strings are partitioned, any non-matching locations in the common pattern block 330 can be identified and the highest confidence OCR result can be selected to resolve the ambiguity. For example, in FIG. 5, "Z" vs. "2" ambiguity in the original common pattern block can be resolved.

Each remaining (residual) block 335 can then be processed again utilizing the correlation analysis. The iterative processing is robust to dropped characters and/or additional (erroneous) characters in the codes. The processing of residual block #1 generates a result in FIG. 6 and the common pattern block 335 is completely matching. The residual "B" can then be processed again utilizing the similar technique. The character "B" represents "dangling character" as there is nothing to compare "B" with other codes. Based on location information, the OCR confidence for the "B" character can be compared to a predetermined threshold to decide whether or not it can be kept as part of the final system-level ALPR result. If this character possesses a sufficient confidence value, it can be added to a final result, otherwise it can be dropped. The same analysis can be performed for the dangling "5" character in FIG. 5. If the residual blocks for both codes are of different lengths, an optimal alignment (i.e., they have no characters in common) cannot be found, hence an error can be flagged. Under these conditions, conclusion cannot be drawn by leveraging the information across the multiple ALPR results. For example, if the residuals shown in FIG. 5 are instead "BB" and "A" (perhaps due to an OCR error for the first code).

The processing can be terminated when all characters can be labeled as "complete", either they are common across the codes, they are added/dropped based on a confidence threshold, or an error occurred in the processing and the results can be inconclusive. The secondary error checking can be applied once the low-level character by character processing is complete. The information regarding valid license plate sequences for different states or jurisdictions can be leveraged. This information can be obtained directly from local motor vehicle bureaus or, as is more typical due to logistical issues, learned from example training data.

The plate masks such as, for example, three letters followed by four numbers (LLL-NNNN), placement of characters in particular positions such as the new NY plate using the letter 'F' in the first position for passenger vehicles, and the frequency that each mask and character combination appears in the training set can be employed as input to a machine learning module that determines a jurisdiction of the vehicle or the plate state. The module determines a likely state, but the confidence associated with the conclusion is useful in determining whether a plate code is likely correct. If errors exist in the plate code, it's likely that this type of mask and character placement can be infrequently seen in training and can safely refuse to conclude or reject that particular code as erroneous.

For example, consider a NY license plate with real code "ABC1234", but an ALPR result of "A8C1234". Here the "B" can be mistaken for an "8" and the plate code is highly unlikely (actually it is not valid based on our training data and known DMV rules). Thus, the state identification module can have an extremely low confidence for the result. Sorting the decisions made at the character level from a lowest margin to a highest margin above an OCR threshold permits to undo these changes (if need be) starting with the one most likely to be wrong. This process continues as long as the state identification module returns a low confidence for the overall ALPR result. Note that a valid conclusion requires both the plate code and the plate state, so processing can yield the most likely valid conclusion for the available information.

Figure 7:
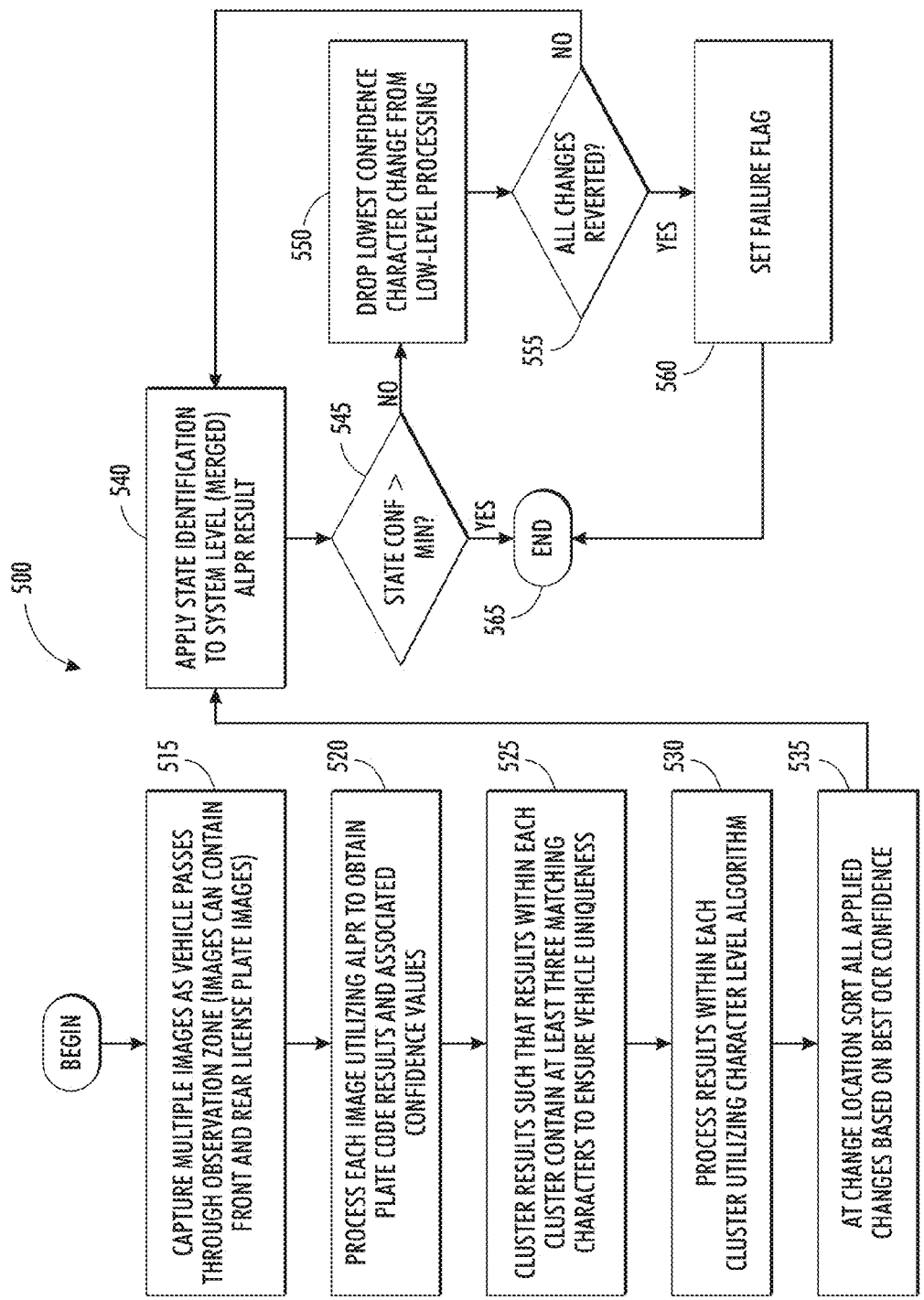
FIG. 7 illustrates a high level flow chart of operations illustrating logical operational steps of a method for enhancing performance of the automated license plate recognition system utilizing multiple results, in accordance with the disclosed embodiments.

FIG. 7 illustrates a high level flow chart of operations illustrating logical operational steps of a method 500 for enhancing performance of the automated license plate recognition system 300 utilizing multiple results, in accordance with the disclosed embodiments. It can be appreciated that the logical operational steps shown in FIGS. 7-8 can be implemented or provided via, for example, a module such as module 252 shown in FIG. 3 and can be processed via a processor such as, for example, the processor 201 shown in FIG. 2. Initially, multiple images can be captured as the vehicle 350 passes through an observation zone, as indicated at block 515. Note that the images can be, for example, front and rear license plate images. Each image can be processed utilizing the ALPR module 252 to obtain the plate code result and associated confidence value, as shown at block 520. Thereafter, as depicted at block 525, the results can be clustered such that the results within each cluster contain at least three matching characters to ensure vehicle uniqueness. The results can be processed within each duster utilizing character level processing unit 320, as shown at block 530.

The applied changes can be sorted based on best OCR confidence at change location, as indicated at block 535. The state identification can be applied to system level (merged) ALPR result, as illustrated at block 540. A determination can be made whether the state confidence is greater than a minimum value, as shown at block 545. If the state confidence is greater than a minimum value, the process can be terminated, as shown at block 565. Otherwise, the lowest confidence character change from low level processing can be dropped, as indicated at block 550. A determination can then be made whether all changes are reverted, as illustrated at block 555. If all changes are reverted, a failure tag can be set, as shown at block 560. Otherwise, the process continues from block 540.

Note that the method 500 utilizes three confidence values as part of the logic for determining the overall ALPR result. Parameters/data associated with the OCR confidence can be 'inside characters' or characters bounded by other valid characters. Other parameters or data for the OCR confidence can be for 'border characters' or the first and last characters of the plate code. Note that border characters are more error prone due to unpredictable material on edges of the plate such as stickers and plate covers so a higher OCR confidence is required for a character to be considered valid.

Figure 8:
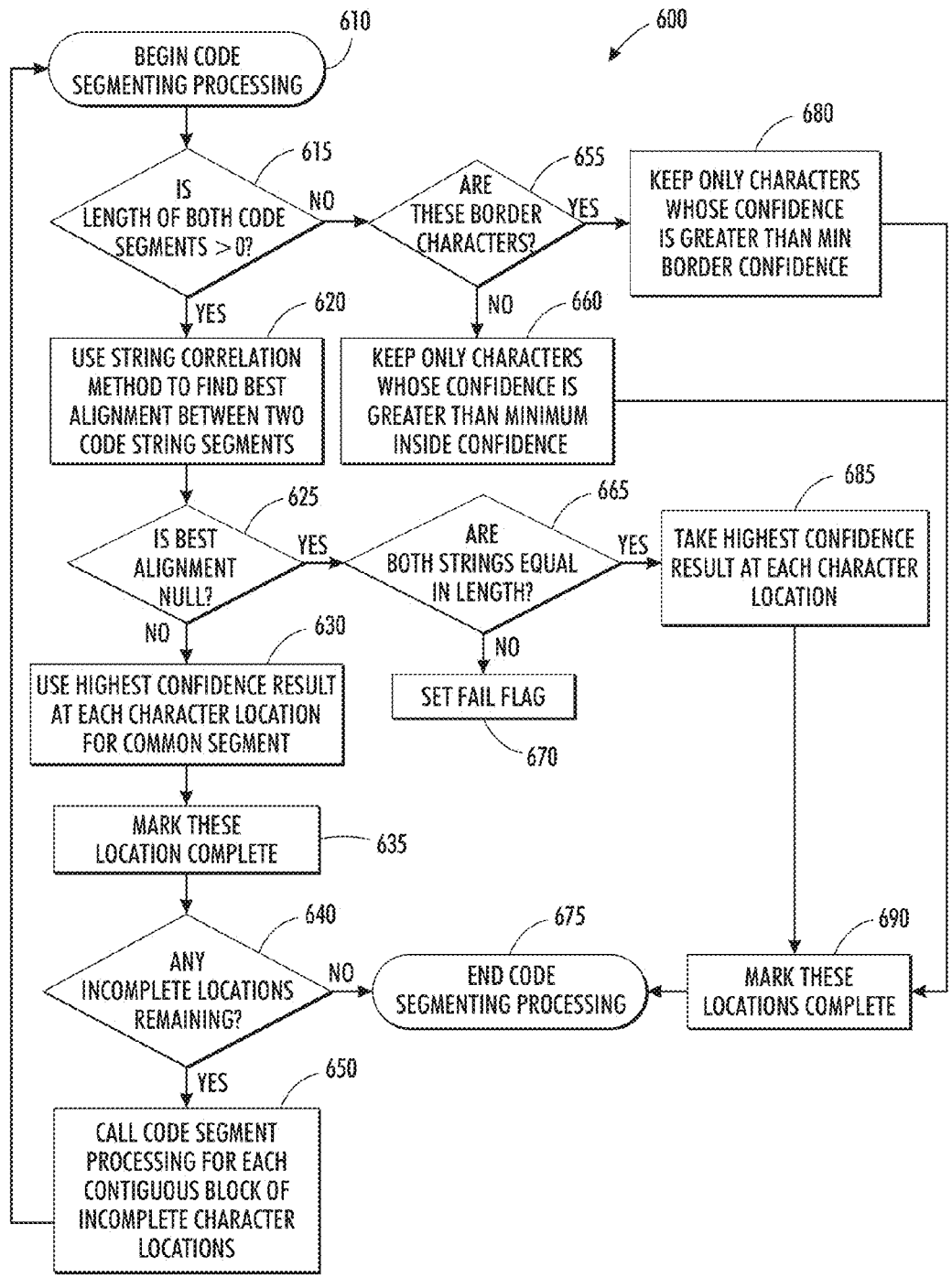
FIG. 8 illustrates a high level flow chart of operations illustrating logical operational steps of a character level logic flow method, in accordance with the disclosed embodiments.

FIG. 8 illustrates a high level flow chart of operations illustrating logical operational steps of a character level logic flow method 600, in accordance with the disclosed embodiments. The code segmenting processing can be initiated, as indicated at block 610. A determination can be made whether length of both code segments are greater than zero, as shown at block 615. If the length of both code segments are greater than zero, the string correlation approach 340 can be employed to determine best alignment between two code string segments, as illustrated at block 620. Thereafter, as shown at block 625, a determination can be made whether the best alignment is null.

If the best alignment is not null, the highest confidence result at each character location can be employed for each common segment, as illustrated at block 630. The location can then be marked as complete, as indicated at block 635. Another determination can be made whether any incomplete location is remaining, as depicted at block 640. If incomplete location is remaining, the code segment processing can be called for each contiguous block of incomplete character location, as shown at block 650. Otherwise the code segment processing can be terminated, as indicated at block 675. If the length of the code is not greater than zero, a determination can be made whether the characters are border characters, as depicted at block 655. If the characters are border characters, the characters whose confidence is greater than minimum border confidence can be obtained and the location can be marked as complete as shown at blocks 680 and 690.

If the characters are not border characters, the characters whose confidence is greater than minimum inside confidence can be obtained and the location can be marked as complete as shown at blocks 660 and 690. If the best alignment is null, a determination can be made whether both the strings are equal in length, as illustrated at block 665. If both the strings are equal in length, the highest confidence result at each character location can be taken and the location can be marked as complete, as depicted at blocks 685 and 690. Otherwise, a fail flag can be set, as shown at block 670.

Figure 9:
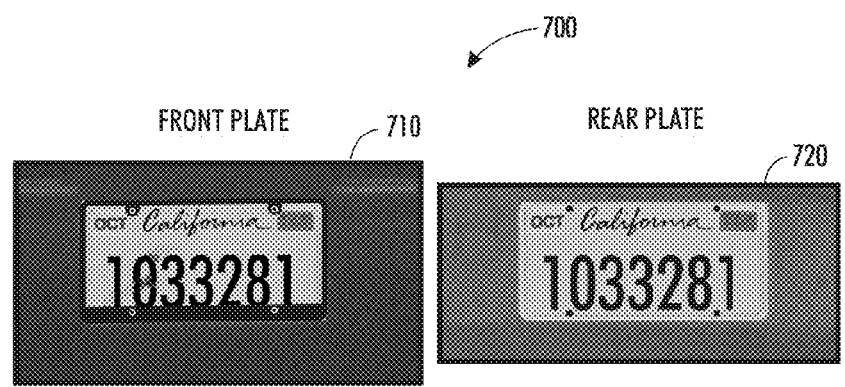
FIGS. 9-10 illustrate a perspective view of license plate images and sample data obtained from the license plate recognition system depicting OCR error correction, in accordance with the disclosed embodiments.
Figure 10:
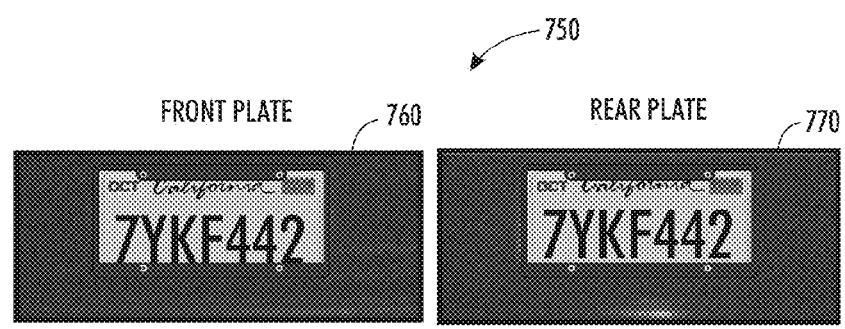

FIGS. 9-10 illustrate a perspective view of license plate images and sample data 700 and 750 obtained from the license plate recognition system 300 depicting OCR error correction, in accordance with the disclosed embodiments. FIGS. 9-10 includes a region of interest image (ROI) 710, 720, 760, and 770 extracted by the LPR system 300 and an associated license plate code 715 and 765, an overall confidence for the plate 725 and 775 (mean confidence across the characters), and an individual OCR character confidence 735 and 780 returned by the system 300. The number of characters is identical with minimal OCR errors present and the common pattern block 330 includes the whole string in each case and a highest confidence character at each position can be considered in order to yield a higher confidence (correct) result.

Figure 11:
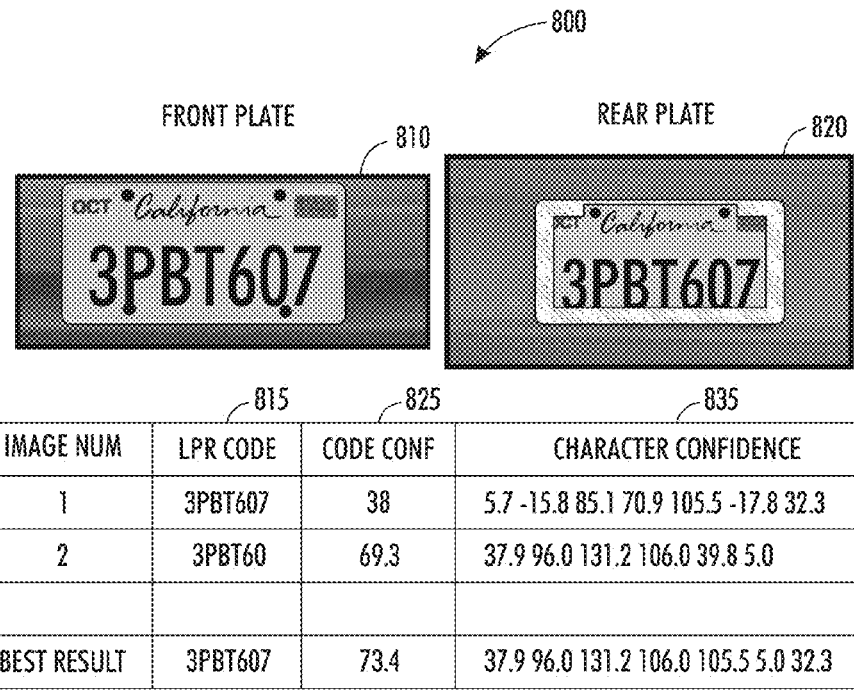
FIGS. 11-12 illustrate a perspective view of license plate images and sample data obtained from the license plate recognition system depicting dropped character correction, in accordance with the disclosed embodiments.
Figure 12:
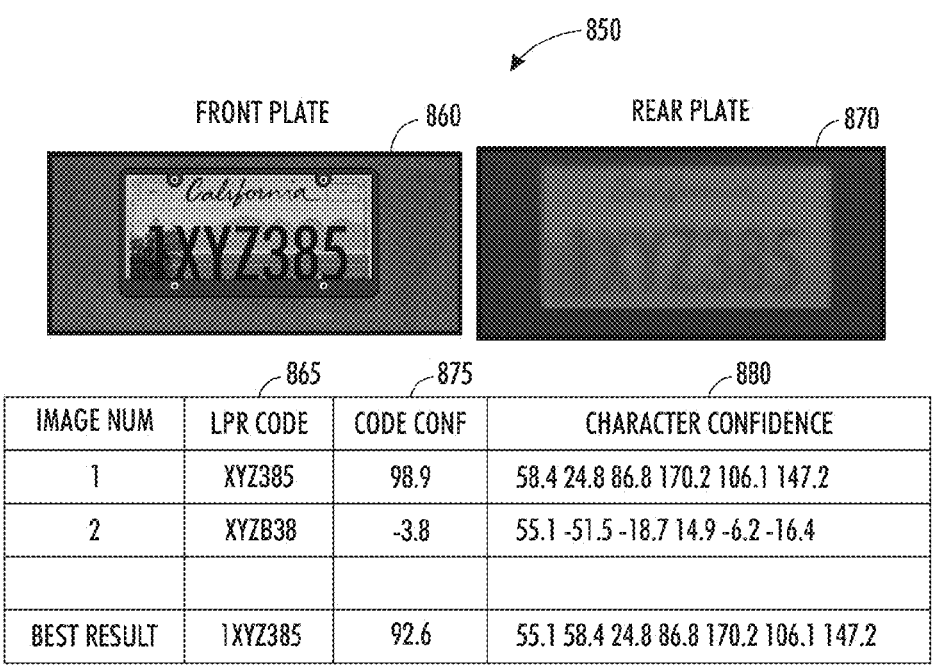

FIGS. 11-12 illustrate a perspective view of license plate images and sample data 800 and 850 obtained from the license plate recognition system 300 depicting dropped character corrections, in accordance with the disclosed embodiments. FIGS. 11-12 includes the region of interest image (ROI) 810, 820, 860, and 870 extracted by the LPR system 300, the associated license plate code 815 and 865, overall confidence for the plate 825 and 875 (mean confidence across the characters), and individual OCR character confidences 835 and 880 returned by the system 300. FIG. 11 shows an extra character in code 1 of '7' by aligning the two codes utilizing the string correlation approach 340. The extra ("dangling") character possesses a confidence value that is greater than a predetermined border OCR threshold of −50, hence the extra character can be added to the result. FIG. 12 also shows extra characters by aligning the two codes utilizing the string correlation approach 340. The extra ("dangling") character has a confidence value that is greater than the predetermined border OCR threshold of −50, hence the extra character can be added to the result.

Figure 13:
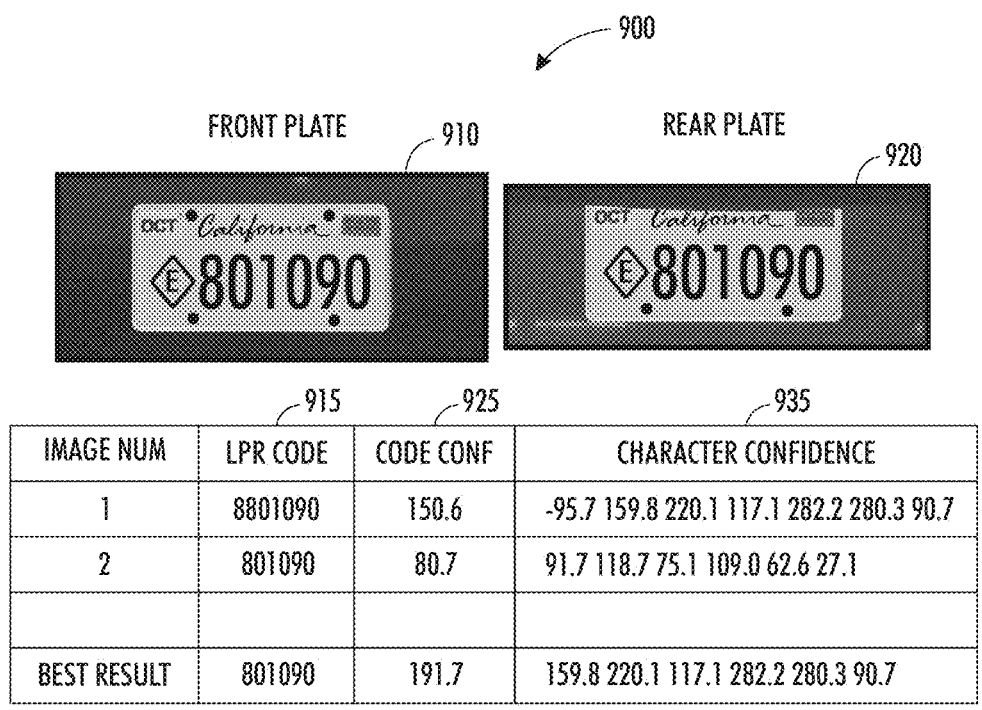
FIG. 13 illustrates a perspective view of license plate images and sample data obtained from the license plate recognition system depicting extra character correction, in accordance with the disclosed embodiments.

FIG. 13 illustrates a perspective view of license plate images and sample data 900 obtained from the license plate recognition system 100 depicting extra character corrections, in accordance with the disclosed embodiments. FIG. 13 includes the region of interest image (ROI) 910 and 920 extracted by the LPR system 300, the associated license plate code 915, overall confidence for the plate 925 (mean confidence across the characters), and individual OCR character confidences 935 returned by the system 300. In FIG. 13, the string alignment shows an extra character '8' at the beginning. As the characters confidence is below the border threshold, it can be dropped from the result.

Note that the methods 500 and 600 described herein illustrates a solution when the LPR results are available for a single transaction, however, this can be expanded to cover transactions where multiple vehicles can be captured via the clustering method. The LPR results from all of the images can be clustered based on number of characters in common. The clustering doesn't have to be very restrictive since it's not likely that a few vehicles captured can have very similar plate codes. The clustering can be performed utilizing string alignment and for the best alignment, the common characters can be counted. Once the clusters of unique vehicles are identified, the methods 500 and 600 can be implemented to obtain the best result.

Based on the foregoing, it can be appreciated that a number of embodiments, preferred and alternative, are disclosed and discussed herein. For example, in one embodiment, a method for enhancing performance of an automated license plate recognition can be implemented. Such a method can include, for example, capturing one or more or a group of images with respect to one or more vehicles passing through an observation zone and processing each image among the images utilizing an automatic license plate recognition unit to obtain a plate code result and a confidence value, iteratively processing character level information across an optical character recognition code followed by a higher level error checking operation based on a learned context information, and optimally aligning the optical character recognition code with respect to the images despite a noise factor utilizing a string correlation approach to thereafter leverage an optical character recognition confidence and state mask information with respect to the plate code result and the confidence value to select a character for the output plate code while taking into account an error source so as to yield more accurate results thereof.

In another embodiment, the aforementioned images can include images of at least one of, for example, a front license plate image and a rear license plate image. In another embodiment, the step of iteratively processing the character level information can further include the steps of parsing through an optical character recognition result and identifying a common pattern between the result utilizing the string correlation approach; recording a plurality of matching characters between the codes at each index value by sliding result strings past one another location by location; and identifying an index value which provides a most common element between the strings utilizing a correlation information and thereafter aligning the strings based on an optimal offset to partition the code into the common pattern and a residual block.

In another embodiment, steps can be provided for identifying a non-matching location in the common pattern and selecting a highest confidence optical character recognition result to resolve an ambiguity after partitioning the code string; processing each remaining residual block utilizing the correlation analysis and setting an error flag if the residual block for both codes are of different lengths and have no characters in common; and terminating the algorithm if all characters are labeled as complete.

In yet another embodiment, steps can be implemented for applying a secondary error checking if the low-level character by character processing is complete to leverage information regarding a valid license plate sequence for a plurality of states; and determining a jurisdiction of the vehicle (or vehicles) by utilizing a plate mask, a placement of character in a particular position, and a frequency that each mask and character combination appears in a training set as input to a machine learning module.

In still another embodiment, steps can be implemented for determining a likely state by the machine learning module and a likely plate code by a confidence associated with a conclusion; sorting decisions made at a character level from a lowest margin to a highest margin above an optical character recognition threshold to undo a change starting with a most likely wrong; and continuing the process as long as a state identification module returns a low confidence for an overall result.

In other embodiments, a step can be implemented for determining the automated license plate recognition result utilizing at least three confidence values. In still other embodiments, the aforementioned at least three confidence values can include, for example, one or more of the following types of confidence values: an optical character recognition confidence for an inside character and a character bounded by other valid character; an optical character recognition for a border character and a first and a last character of the plate code; and a state identification confidence.

In still another embodiment, a system can be implemented for enhancing performance of an automated license plate recognition. Such a system can include, for example, a processor, a data bus coupled to the processor, and a computer-usable medium embodying computer program code, the computer-usable medium being coupled to the data bus. Such computer program code can include instructions executable by the processor and configured, for example, for capturing one or more or a group of images with respect to one or more vehicles passing through an observation zone and processing each image among the images utilizing an automatic license plate recognition unit to obtain a plate code result and a confidence value; iteratively processing character level information across an optical character recognition code followed by a higher level error checking operation based on a learned context information; and optimally aligning the optical character recognition code with respect to the images despite a noise factor utilizing a string correlation approach to thereafter leverage an optical character recognition confidence and state mask information with respect to the plate code result and the confidence value to select a character for the output plate code while taking into account an error source so as to yield more accurate results thereof.

In yet another embodiment, the aforementioned images can include images of at least one of, for example, a front license plate image and a rear license plate image. In other embodiments, the instructions for iteratively processing the character level information can be configured to include instructions for: parsing through an optical character recognition result and identifying a common pattern between the result utilizing the string correlation approach; recording a plurality of matching characters between the codes at each index value by sliding result strings past one another location by location; and identifying an index value which provides a most common element between the strings utilizing a correlation information and thereafter aligning the strings based on an optimal offset to partition the code into the common pattern and a residual block.

In still another system embodiment, instructions can be further configured for identifying a non-matching location in the common pattern and selecting a highest confidence optical character recognition result to resolve an ambiguity after partitioning the code string; processing each remaining residual block utilizing the correlation analysis and setting an error flag if the residual block for both codes are of different lengths and have no characters in common; and terminating the algorithm if all characters are labeled as complete.

In another system embodiment, instructions can be further configured for applying a secondary error checking if the low-level character by character processing is complete to leverage information regarding a valid license plate sequence for a plurality of states; and determining a jurisdiction of the vehicle (or vehicles) by utilizing a plate mask, a placement of character in a particular position, and a frequency that each mask and character combination appears in a training set as input to a machine learning module.

In yet another system embodiment, instructions can be further configured for determining a likely state by the machine learning module and a likely plate code by a confidence associated with a conclusion; sorting decisions made at a character level from a lowest margin to a highest margin above an optical character recognition threshold to undo a change starting with a most likely wrong; and continuing the process as long as a state identification module returns a low confidence for an overall result. In other system embodiments, such instructions can be further configured for determining the automated license plate recognition result utilizing at least three confidence values.

Such at least three confidence values comprise one or more of the following types of confidence values: an optical character recognition confidence for an inside character and a character bounded by other valid character; an optical character recognition for a border character and a first and a last character of the plate code; and a state identification confidence.

In still another embodiment, a processor-readable medium storing code representing instructions to cause a process enhance performance of an automated license plate recognition can be implemented. Such code can include code to, for example, capture one or more or a group of images with respect to one or more vehicles passing through an observation zone and processing each image among the images utilizing an automatic license plate recognition unit to obtain a plate code result and a confidence value; iteratively process character level information across an optical character recognition code followed by a higher level error checking operation based on a learned context information; and optimally align the optical character recognition code with respect to the images despite a noise factor utilizing a string correlation approach to thereafter leverage an optical character recognition confidence and state mask information with respect to the plate code result and the confidence value to select a character for the output plate code while taking into account an error source so as to yield more accurate results thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for enhancing the performance of an automated license plate recognition unit, said method comprising:
    capturing a plurality of images with respect to at least one vehicle passing through an observation zone and processing each image among said plurality of images utilizing an automatic license plate recognition unit to obtain a plate code result and a confidence value;
    iteratively processing character level information across an optical character recognition code followed by a higher level error checking operation based on a learned context information; and
    optimally aligning said optical character recognition code with respect to said plurality of images despite a noise factor utilizing a string correlation approach to thereafter leverage an optical character recognition confidence and state mask information with respect to said plate code result and said confidence value to select a character for said output plate code while taking into account an error source so as to yield more accurate results thereof.

2. The method of claim 1 wherein said plurality of images comprises images of at least one of: a front license plate image; and a rear license plate image.

3. The method of claim 1 wherein iteratively processing said character level information, further comprises:
    parsing through an optical character recognition result and identifying a common pattern between said result utilizing said string correlation approach;
    recording a plurality of matching characters between said codes at each index value by sliding result strings past one another location by location; and
    identifying an index value which provides a most common element between said strings utilizing a correlation information and thereafter aligning said strings based on an optimal offset to partition said code into said common pattern and a residual block.

4. The method of claim 3 further comprising:
    identifying a non-matching location in said common pattern and selecting a highest confidence optical character recognition result to resolve an ambiguity after partitioning said code string;
    processing each remaining residual block utilizing said correlation analysis and setting an error flag if said residual block for both codes are of different lengths and have no characters in common; and
    terminating said algorithm if all characters are labeled as complete.

5. The method of claim 1 further comprising:
    applying a secondary error checking if said low-level character by character processing is complete to leverage information regarding a valid license plate sequence for a plurality of states; and
    determining a jurisdiction of said at least one vehicle by utilizing a plate mask, a placement of character in a particular position, and a frequency that each mask and character combination appears in a training set as input to a machine learning module.

6. The method of claim 5 further comprising:
    determining a likely state by said machine learning module and a likely plate code by a confidence associated with a conclusion;
    sorting decisions made at a character level from a lowest margin to a highest margin above an optical character recognition threshold to undo a change starting with a most likely wrong; and
    continuing said process as long as a state identification module returns a low confidence for an overall result.

7. The method of claim 1, further comprising determining said automated license plate recognition result utilizing at least three confidence values.

8. The method of claim 7 wherein said at least three confidence values comprises at least one of the following types of confidence values:
    an optical character recognition confidence for an inside character and a character bounded by other valid character;
    an optical character recognition for a border character and a first and a last character of said plate code; and
    a state identification confidence.

9. A system for enhancing the performance of an automated license plate recognition unit, said system comprising:
    a processor;
    a data bus coupled to said processor; and
    a computer-usable medium embodying computer program code, said computer-usable medium being coupled to said data bus, said computer program code comprising instructions executable by said processor and configured for:
        capturing a plurality of images with respect to at least one vehicle passing through an observation zone and processing each image among said plurality of images utilizing an automatic license plate recognition unit to obtain a plate code result and a confidence value;

iteratively processing character level information across an optical character recognition code followed by a higher level error checking operation based on a learned context information; and optimally aligning said optical character recognition code with respect to said plurality of images despite a noise factor utilizing a string correlation approach to thereafter leverage an optical character recognition confidence and state mask information with respect to said plate code result and said confidence value to select a character for said output plate code while taking into account an error source so as to yield more accurate results thereof.

10. The system of claim 9 wherein said plurality of images comprises of images of at least one of: a front license plate image and a rear license plate image.

11. The system of claim 9 wherein said instructions for iteratively processing said character level information are further configured to comprise instructions for:

parsing through an optical character recognition result and identifying a common pattern between said result utilizing said string correlation approach;

recording a plurality of matching characters between said codes at each index value by sliding result strings past one another location by location; and identifying an index value which provides a most common element between said strings utilizing a correlation information and thereafter aligning said strings based on an optimal offset to partition said code into said common pattern and a residual block.

12. The system of claim 11 wherein said instructions are further configured for:

identifying a non-matching location in said common pattern and selecting a highest confidence optical character recognition result to resolve an ambiguity after partitioning said code string;

processing each remaining residual block utilizing said correlation analysis and setting an error flag if said residual block for both codes are of different lengths and have no characters in common; and terminating said algorithm if all characters are labeled as complete.

13. The system of claim 9 wherein said instructions are further configured for:

applying a secondary error checking if said low-level character by character processing is complete to leverage information regarding a valid license plate sequence for a plurality of states; and determining a jurisdiction of said at least one vehicle by utilizing a plate mask, a placement of character in a particular position, and a frequency that each mask and character combination appears in a training set as input to a machine learning module.

14. The system of claim 13 wherein said instructions are further configured for:

determining a likely state by said machine learning module and a likely plate code by a confidence associated with a conclusion;

sorting decisions made at a character level from a lowest margin to a highest margin above an optical character recognition threshold to undo a change starting with a most likely wrong; and continuing said process as long as a state identification module returns a low confidence for an overall result.

15. The system of claim 9 wherein said instructions are further configured for determining said automated license plate recognition result utilizing at least three confidence values.

16. The system of claim 15 wherein said at least three confidence values comprises at least one of the following types of confidence values:

an optical character recognition confidence for an inside character and a character bounded by other valid character;

an optical character recognition for a border character and a first and a last character of said plate code; and a state identification confidence.

17. A non-transitory processor-readable medium storing code representing instructions to cause a process to enhance the performance of an automated license plate recognition unit, said code comprising code to:

capture a plurality of images with respect to at least one vehicle passing through an observation zone and processing each image among said plurality of images utilizing an automatic license plate recognition unit to obtain a plate code result and a confidence value;

iteratively process character level information across an optical character recognition code followed by a higher level error checking operation based on a learned context information; and optimally align said optical character recognition code with respect to said plurality of images despite a noise factor utilizing a string correlation approach to thereafter leverage an optical character recognition confidence and state mask information with respect to said plate code result and said confidence value to select a character for said output plate code while taking into account an error source so as to yield more accurate results thereof.

18. The non-transitory processor-readable medium of claim 17 wherein said plurality of images comprises images of at least one of: a front license plate image; and a rear license plate image.

19. The non-transitory processor-readable medium of claim 17 wherein said code further comprises code to:

parse through an optical character recognition result and identify a common pattern between said result utilizing said string correlation approach;

record a plurality of matching characters between said codes at each index value by sliding result strings past one another location by location; and identify an index value which provides a most common element between said strings utilizing a correlation information and thereafter aligning said strings based on an optimal offset to partition said code into said common pattern and a residual block.

20. The non-transitory processor-readable medium of claim 19 wherein said code further comprises code to:

identify a non-matching location in said common pattern and selecting a highest confidence optical character recognition result to resolve an ambiguity after partitioning said code string;

process each remaining residual block utilizing said correlation analysis and set an error flag if said residual block for both codes are of different lengths and have no characters in common; and terminate said algorithm if all characters are labeled as complete.

* * * * *